UNITED STATES PATENT OFFICE.

JOHN HERBERT THWAITES, OF PETERBOROUGH, ENGLAND.

TREATMENT OF COPPER LIQUORS.

1,069,205.  Specification of Letters Patent.  Patented Aug. 5, 1913.

No Drawing.   Application filed December 27, 1911. Serial No. 668,136.

*To all whom it may concern:*

Be it known that I, JOHN HERBERT THWAITES, M. Sc., a subject of the King of Great Britain, residing in Peterborough, and whose post-office address is Market Chambers, Peterborough, in the county of Northampton, England, chemical engineer, have invented certain new and useful Improvements in the Treatment of Copper Liquors, of which the following is a specification.

The known application of zinc sulfid as a precipitant for copper in copper liquors presents certain advantages, among which is the fact that little or no iron accompanies the precipitated copper sulfid.

According to the present invention the zinc sulfid is used in the form of a mixture of barium sulfate and zinc sulfid, such as is obtained by precipitating a solution of zinc sulfate with barium sulfid. This product, which must not have been dried or calcined, is used in manner substantially similar to that in which zinc sulfid has been used, to precipitate the copper as sulfid from liquors containing copper, whereby zinc passes into solution and barium sulfate remains mixed with the precipitated copper sulfid. This mixture is oxidized as far as possible, in known manner, such as by drying and heating the air. A large proportion of the CuS is oxidized to $CuSO_4$ during drying, the oxidation of the remainder being completed in a few hours at 210 to 250° C. The mixture containing the copper sulfate is then leached with water to extract the latter, such quantity of sulfuric acid as may be necessary to convert any copper oxid that may be present into sulfate, being added, preferably to a portion only of the water used for leaching. The residue of barium sulfate is now converted into sulfid by thoroughly mixing the sulfate with powdered coal and heating the mixture in a suitable furnace. The material after it has cooled is leached with water and filtered the filtrate being used to precipitate the zinc from the liquor from which the copper has been removed. This liquor must contain a dissolved sulfate, which may be present as an original constituent of the liquor or may be added at this stage or previously, otherwise barium sulfate would not be precipitated together with the zinc sulfid, as is necessary for the process. The mixture of zinc sulfid and barium sulfate thus produced is then used to precipitate copper from another batch of copper liquor. This precipitation may be represented by the chemical equation $$CuSO_4 + ZnS, BaSO_4 = CuS, BaSO_4 + ZnSO_4.$$

The oxidation of copper sulfid to copper sulfate may be represented by the chemical equation $$CuS + 2O_2 = CuSO_4.$$

The reduction of barium sulfate to barium sulfid by carbon may be represented by the chemical equation $$BaSO_4 + 4C = BaS + 4CO.$$

Copper liquors of the kind in question generally contain sufficient zinc to make up for losses in the process, so that it is then only necessary to introduce a little fresh barium sulfate periodically to make up for loss of this material.

I wish it to be understood that by barium sulfate in this specification and in the claims thereto I mean not only the substantially pure compound but any commercial mixture thereof with strontium sulfate and indeed substantially pure strontium sulfate itself.

The main object of the process is the production of copper sulfate substantially free from iron. In this connection the use of the mixture of barium sulfate and zinc sulfid presents the advantage that the precipitant can be used repeatedly without import of fresh material other than the fuel used to reduce the barium sulfate to sulfid. Moreover, the copper sulfid being spread over a basis of barium sulfate is more rapidly and completely oxidized than is the case with the dense copper sulfid precipitated by zinc sulfid alone. The presence of the $BaSO_4$ causes the CuS and the ZnS respectively to settle rapidly, whereas in the absence of $BaSO_4$ each forms a bulky precipitate very difficult to treat. Hence the process as a whole is more rapid than any hitherto devised and the capital locked up in plant, and floating stock of copper is comparatively small.

The copper liquors of the ordinary wet copper process practically always contain some zinc but not much iron. After copper has been precipitated from them by scrap iron in the usual manner the large amount of iron thus dissolved prevents economical recovery of the zinc from the liquor by ordinary methods, and indeed by any method if the zinc is in small proportion relatively to the iron. On the other hand the amount of iron originally present in the copper liquor is generally insufficient to interfere with the recovery of the zinc. Now it will be seen that in the process according to this invention, the zinc in the copper liquor serves to make up any loss of the zinc which is used in the form of sulfid for precipitating the copper, but there is generally more zinc than is sufficient for this purpose and this excess may be worked up in one of several ways. For example, it may be precipitated with soda ash to produce crude zinc oxid for smelting, or it may be treated with bleaching powder to precipitate any iron that may be present, and the latter having been filtered off, the filtrate may be precipitated in the known manner for producing lithopone.

A further advantage of the process is that it renders very easy the recovery of any silver which the liquor may contain.

I have found that the silver contained in the copper liquor is precipitated as sulfid together with the copper sulfid when the mixture of barium sulfate and zinc sulfid is added: indeed, generally, the whole of the silver is precipitated with the first part of the copper. According to the invention this mixture of sulfids and barium sulfate is treated so as to oxidize the copper sulfid while leaving the silver in a form insoluble in water or dilute acid, still mixed with the barium sulfate; the oxidized copper sulfid is then removed from the barium sulfate, and the latter is treated by a suitable method for extracting the silver without destroying the barium sulfate, which is afterward reduced to barium sulfid for further use as hereinbefore described. Preferably the mixture of barium sulfate, copper sulfid and silver sulfid is heated sufficiently in air, in known manner, to convert the copper sulfid into sulfate leaving the silver sulfid unchanged. The mass is then first leached with water to dissolve copper sulfate and finally with dilute sulfuric acid to dissolve copper oxid, if any of this has been formed.

The best method at present known of treating the barium sulfate containing the silver sulfid is to subject it to the action of a chlorid or mixture adapted to convert the silver sulfid into chlorid and then to leach it with a solvent for silver chlorid; or the converting agent and the solvent may be used together. A suitable converting agent is one of the chlorids of copper or a mixture of them, cuprous chlorid being rather better than cupric chlorid; brine or a soluble thio-sulfate is the best solvent.

The conversion of silver sulfid into silver chlorid by action of cuprous chlorid may be represented by the chemical equation $$Ag_2S + Cu_2Cl_2 = Cu_2S + 2AgCl.$$

The best procedure is to treat the barium sulfate containing the silver sulfid with a solution of a chlorid of copper and common salt and subsequently to leach it with a solution of common salt.

Any known method for recovering the silver from the solution of silver chlorid may be used, such as precipitation by zinc. The preferred procedure is to allow the barium sulfate from which the copper sulfate has been leached to remain in the filter press and to run into the press brine containing cuprous chlorid, sufficient to convert into chlorid the silver sulfid in the barium sulfate. After the press has been at rest for, say, an hour, brine or a strong solution of sodium thiosulfate is pumped through it to obtain a solution containing silver chlorid. The barium sulfate is then reduced to sulfid and returned to the process as hereinbefore described.

Having thus described the nature of my said invention and the best means I know of carrying the same into practical effect, I claim:—

1. A process for treating copper liquors, which process consists in first adding to the copper liquor a mixture of barium sulfate and zinc sulfid which has not been dried, then removing the copper sulfid from the mixture of barium sulfate and copper sulfid thus produced, then reducing the barium sulfate to barium sulfid, and then adding the barium sulfid to the liquor wherefrom the copper sulfid has been precipitated, so as to obtain a mixture of barium sulfate and zinc sulfid for re-use.

2. A process for treating copper liquors, which process consists in first adding to the liquor a mixture of barium sulfate and zinc sulfid which has not been dried, then heating in air the mixture of barium sulfate and copper sulfid thus produced, then leaching the oxidized mixture so as to remove from it the copper compounds, then reducing the barium sulfate to barium sulfid, and then adding the barium sulfid to the liquor from which the copper sulfid has been precipitated so as to obtain a mixture of barium sulfate and zinc sulfid for re-use.

3. A process for treating copper liquors, which process consists in first adding to the liquor a mixture of barium sulfate and zinc sulfid, which has not been dried, then removing the copper sulfid from the mixture of barium sulfate and copper sulfid thus produced, then reducing the barium sulfate to barium sulfid, then adding the barium sulfid to the liquor from which the copper sulfid has been precipitated, then removing from the liquor the mixture of barium sulfate and zinc sulfid thus produced and finally working up the liquor to obtain zinc compounds therefrom.

4. A process for treating copper liquors, which process consists in first adding to the liquor a mixture of barium sulfate and zinc sulfid which has not been dried, then removing the copper sulfid from the mixture of barium sulfate, copper sulfid and silver sulfid, thus produced, then treating the mixture of barium sulfate and silver sulfid with an agent adapted to convert the silver sulfid into a compound soluble in a suitable solvent, then leaching the mixture of barium sulfate and soluble silver compound with such solvent, then reducing the barium sulfate to barium sulfid, and then adding the barium sulfid to the liquor from which the copper sulfid has been precipitated so as to obtain a mixture of barium sulfate and zinc sulfid for re-use.

5. A process for treating copper liquors, which process consists in first adding to the liquor a mixture of barium sulfate and zinc sulfid which has not been dried, then heating in air the mixture of barium sulfate, copper sulfid and silver sulfid thus produced, then leaching the oxidized mixture so as to remove the copper compounds therefrom, then treating the mixture of barium sulfate and silver sulfid with a chlorid adapted to convert the silver sulfid into silver chlorid, then leaching the mixture of barium sulfate and silver chlorid with a solvent for silver chlorid, then reducing the barium sulfate to barium sulfid, and then adding the barium sulfid to the liquor from which the copper sulfid has been precipitated, so as to obtain a mixture of barium sulfate and zinc sulfid for re-use.

6. A process for treating copper liquors, which process consists in first adding to the liquor a mixture of barium sulfate and zinc sulfid which has not been dried, then removing the copper sulfid from the mixture of barium sulfate, copper sulfid and silver sulfid thus produced, then treating the mixture of barium sulfate and silver sulfid with an agent adapted to convert the silver sulfid into a soluble silver compound and at the same time to dissolve the said silver compound, then reducing the barium sulfate to barium sulfid, and then adding the barium sulfid to the liquor from which the copper sulfid has been precipitated, so as to obtain a mixture of barium sulfate and zinc sulfid for re-use.

7. A process for treating copper liquors, which process consists in first adding to the liquor a mixture of barium sulfate and zinc sulfid which has not been dried, then heating in air the mixture of barium sulfate copper sulfid and silver sulfid thus produced, then leaching the copper compounds from the mixture produced by the heating, then treating the mixture of barium sulfate and silver sulfid with a solution of chlorid of copper and common salt and subsequently leaching it with a solution of common salt, then reducing the barium sulfate to barium sulfid, then adding the barium sulfid to the liquor from which the copper sulfid has been precipitated, so as to obtain a mixture of barium sulfate and zinc sulfid for re-use.

8. A process for treating copper liquors, which process consists in first adding to the liquor a mixture of barium sulfate and zinc sulfid which has not been dried, then heating in air the mixture of barium sulfate, copper sulfid and silver sulfid thus produced, then leaching the copper compounds from the mixture obtained by the heating, then treating the mixture of barium sulfate and silver sulfid with a solution of chlorid of copper and common salt, then reducing the barium sulfate to barium sulfid, and then adding the barium sulfid to the liquor from which the copper sulfid has been precipitated, so as to obtain a mixture of barium sulfate and zinc sulfid for re-use.

In testimony whereof I have signed my name to this specification in the presence of two subscribing witnesses.

JOHN HERBERT THWAITES.

Witnesses:
JOSEPH MILLARD,
W. J. SKERTEN.

Copies of this patent may be obtained for five cents each, by addressing the "Commissioner of Patents, Washington, D. C."